Figure 1:
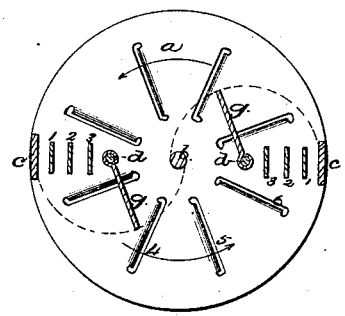
Figure 2:
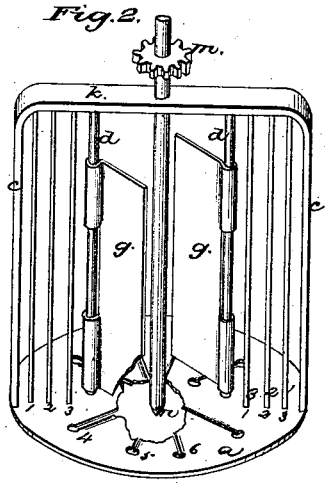
Figure 3:
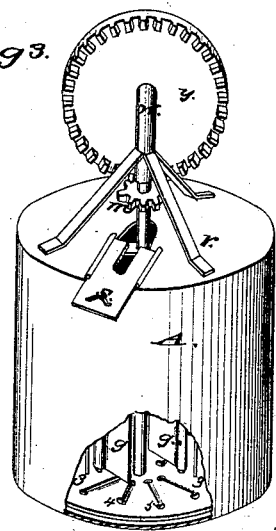

W. C. BURTON.
CHURN.

No. 190,466. Patented May 8, 1877.

Attest:
C. A. Johnson
Franklin Harrison

Inventor
Wiley C. Burton
Thomas C. Orwig
Atty.

N. PETERS, PHOTO-LITHOGRAPHER, WASHINGTON, D. C.

UNITED STATES PATENT OFFICE.

WILEY C. BURTON, OF DES MOINES, IOWA.

IMPROVEMENT IN CHURNS.

Specification forming part of Letters Patent No. 190,466, dated May 8, 1877; application filed January 4, 1877.

*To all whom it may concern:* moved. By removing the cover and then lifting the entire beater, the butter will all be carried along on the disk-formed colander $a$, and the buttermilk drained therefrom to remain in the churn.

I am aware that fixed beaters and hinged gathering-blades have been used in churns, and that a slotted disk having fins on its upper side and cutters on its under side has been combined with a rotary dasher; but I claim that my manner of forming series of fixed vertical blades near the circumference and hinged gathering-blades inside of the fixed blades, and combining therewith a disk having a plain top surface and a series of elevating-cutters, is a novel and valuable improvement, by means of which butter can be quickly churned and gathered in a mass upon the disk $a$, to be elevated, drained, and removed expeditiously and advantageously.

I claim as my invention—

In the construction of a churn, the disk $a$, the shaft $b$, the beater-frame $c\ c\ k$, the two series of fixed vertical blades 1 2 3, and the hinged gathering devices $g$, arranged and combined to operate substantially as and for the purposes shown and described.

WILEY C. BURTON.

Witnesses:
C. A. JOHNSON,
A. L. COOPER.